Figure 4:
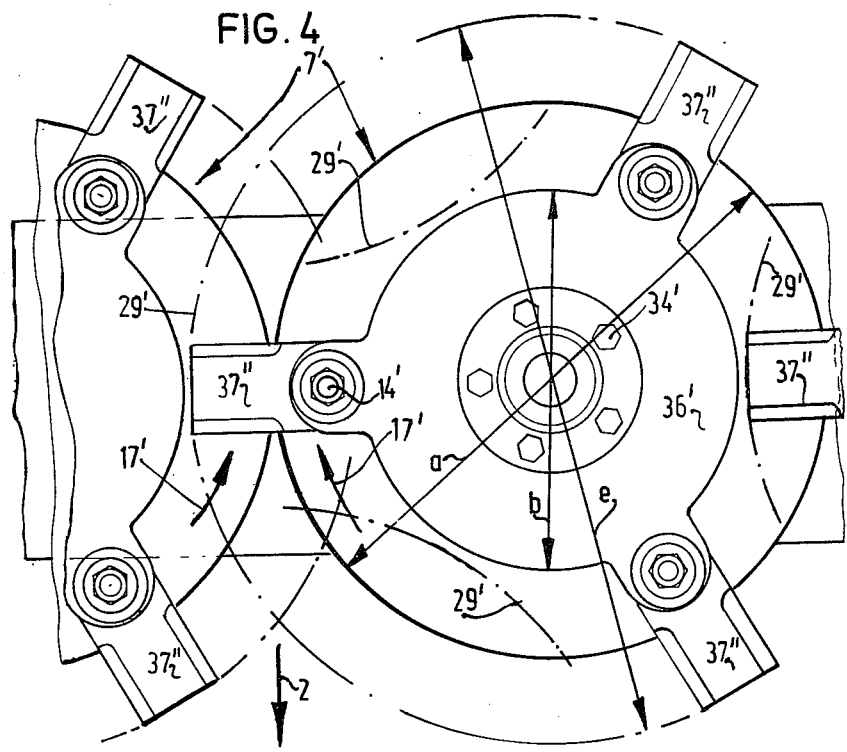

United States Patent [19]

Oosterling et al.

[11] 4,110,959
[45] Sep. 5, 1978

[54] MOWING DEVICE

[75] Inventors: Pieter Adriaan Oosterling; Hendricus Cornelis van Staveren, both of Nieuw-Vennep, Netherlands

[73] Assignee: Multinorm, B.V., Nieuw-Vennep, Netherlands

[21] Appl. No.: 738,079

[22] Filed: Nov. 2, 1976

[30] Foreign Application Priority Data

Nov. 28, 1975 [NL] Netherlands .......................... 7513926

[51] Int. Cl.² ............................................ A01D 55/18
[52] U.S. Cl. ............................................. 56/295; 56/6
[58] Field of Search ............................... 56/6, 295, 255

[56] References Cited

U.S. PATENT DOCUMENTS

| | | | |
|---|---|---|---|
| 3,621,642 | 11/1971 | Leake, Jr. ................................ | 56/295 |
| 3,972,159 | 8/1976 | Oosterling et al. .................... | 56/192 |
| 3,974,630 | 8/1976 | van der Lely .......................... | 56/295 |

Primary Examiner—Russell R. Kinsey
Attorney, Agent, or Firm—Snyder, Brown & Ramik

[57] ABSTRACT

A mowing device comprises a transverse housing and cutters rotatably mounted thereon, each cutting member comprising at least one lower ring skimming the top surface of the housing and having a substantially circular, uninterrupted circumference, an upper ring covering the lower ring and at least one cutter fastened at the circumference of the cutting member between the upper and lower rings to a pin, the cutters of adjacent cutting members being relatively off-set in the circumferential direction. Upon an impact on a stone the cutter may bent over upwardly. In order to reduce the risk of damage of the cutting members and to maintain a more sharply defined level of the paths of the undamaged cutters the lower ring of each cutting member is left uncovered at the area of the passing path of each cutter of a neighboring cutting member.

9 Claims, 6 Drawing Figures

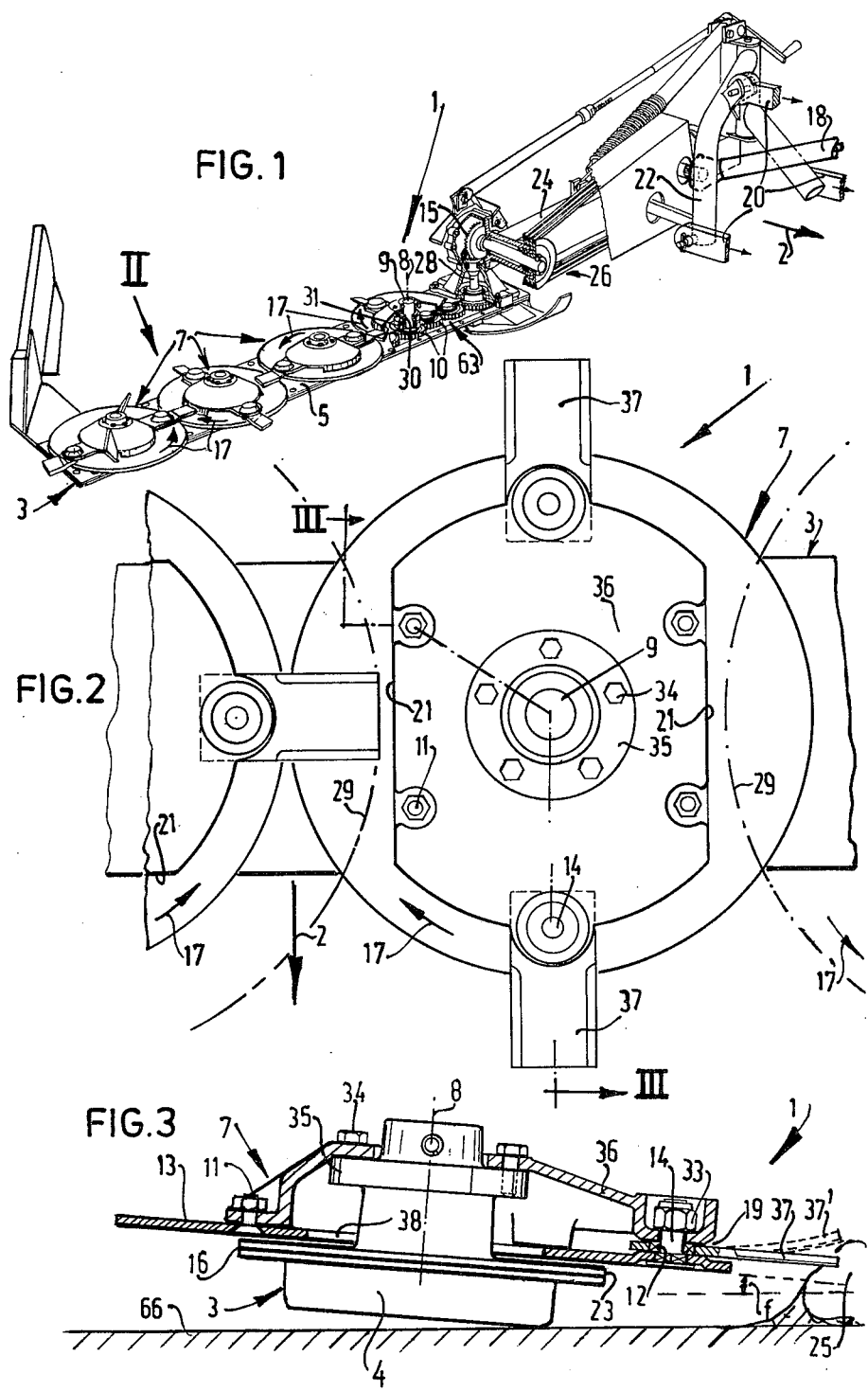

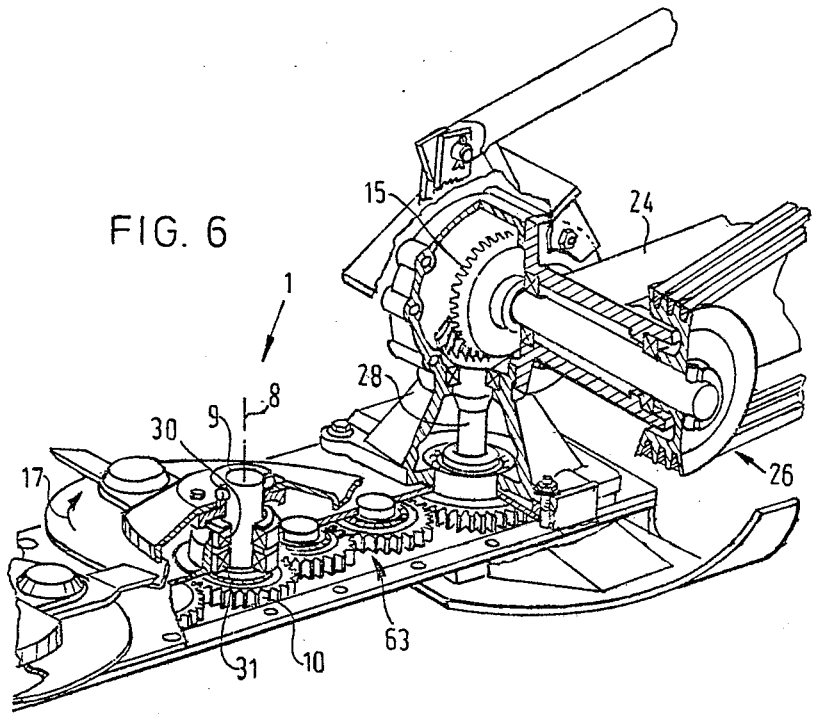

MOWING DEVICE

The invention relates to a moving device comprising a housing extending transversely of the direction of movement of said device, a plurality of cutting members rotatably journalled at said housing and a driving gear arranged in said housing for driving the cutting members, each cutting member comprising at least one lower ring skimming the top surface of the housing and having substantially circular, uninterrupted circumference, an upper ring covering the lower ring and at least one cutter fastened at the circumference of the cutting member between the upper and lower rings to a pin, the cutters of adjacent cutting members being relatively off-set in the circumferential direction.

Such a moving device is known from Dutch Patent Application 7317816 and the corresponding U.K. Pat No. 1,480,799. Herein each cutter is fastened around a pin which is firmly held because the upper as well as the lower end of the pin are supported in a ring. The cutter is fastened around the pin with such an ample amount of clearance that when touching a stone the cutter cannot only turn about the pin but also move upwardly owing to this clearance in order to avoid damage of the moving device. This ample clearance renders the cutting level of the cutter irregular. If in the known mowing device the cutter is fastened between the rings with a small amount of clearance, the risk is involved that upon an impact on a stone the cutter may bent over upwardly and continue to mow in the deformed state so that it repeatedly strikes the upper ring and not only the upper ring and the cutter but also the driving gear of the cutting members will be seriously damaged.

The invention has for its object to reduce the risk of damage of the cutting members and to maintain a more sharply defined level of the paths of the undamaged cutters. For this purpose the lower ring of each cutting member is left uncovered at the area of the passing path of each cutter of a neighbouring cutting member.

The abovementioned and further features of the invention will become evident from the following description with reference to a drawing.

Figure 5:
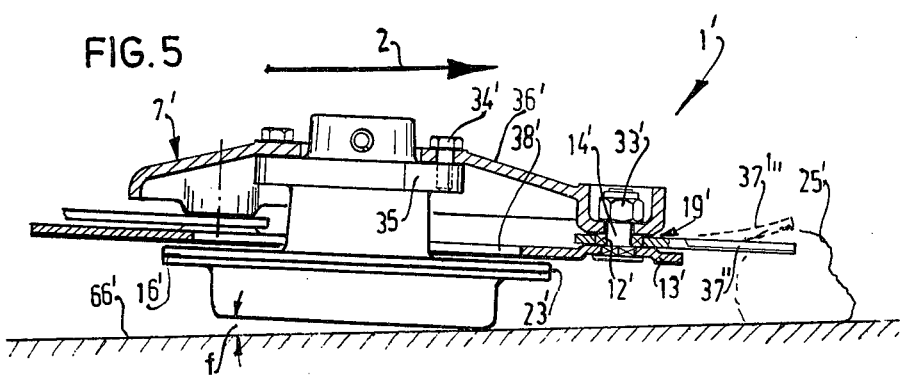

In the drawing:

FIG. 1 is a perspective view partly broken away of a mowing device in accordance with the invention, FIG. 2 is a plan view of detail II of FIG. 1 on an enlarged scale, FIG. 3 is a sectional view taken on the section line III—III in FIG. 2, FIG. 4 is a plan view like FIG. 2 of a further embodiment of the device in accordance with the invention, FIG. 5 is a sectional view taken on the line V—V in FIG. 4, and FIG. 6 is an enlarged view illustrating the drive input end of the structure in FIG. 1.

Referring to FIG. 1, the moving device 1 is connected through an auxiliary frame 24 with framework 22 suspended from the hitch 20 of a tractor (not shown) and is driven via a bevel gear wheel system 15 and a belt transmission 26 through a universal shaft 18 by a power take-off shaft of the tractor.

The mowing device 1 according to the invention comprises a housing 3 extending transversely of its intended direction of movement 2 and having the shape of a flat, elongated beam mainly formed by a channel 4 and a cover 5 secured thereto by bolts 6. At the housing 3 is arranged a plurality of cutting members 7 so as to be rotatable about upright shafts 8. The cutting members 7 are disposed near and above the housing 3 and are adapted to rotate pairwise in opposite directions 17. Each cutting member 7 is rigidly connected through a shaft 9 with a gear 10 of a driving gear means 63 arranged in the housing 3 and formed by a series of gears 10 and driven by the bevel gear wheel system 15.

The shaft 9 of each cutting member 7 is rotatably journalled in an upright collar 31 of the cover 5 in a bearing 30. Each cutting member 7 comprises an upper ring 36 fastened by screws 34 to a hub 35 and a lower ring 13 fastened beneath the former by means of bolts 11, between which one or more, for example, two cutters 37 are secured by means of a pin 14 and a nut 33. The cutter 37 is adapted to rotate about a spacer ring 12, which is firmly clamped between the lower ring 13 and the upper ring 36, a small amount of clearance 19 of for example, 0.2 mm being left between the cutter 37 and the rings 13 and 36 in order to allow the rotation of the cutter 37. The lower ring 13 has an uninterrupted, circular circumference and skims the top side of the housing 3 so that stones cannot become jammed between the housing 3 and the lower ring 13. For this purpose the central, circular recess 38 of the lower ring 13 remains inside the space between the front edge 23 and the rear edge 16 of the housing 3.

At the area of each path of travel 29 of the cutter 37 of a neighbouring cutting member 7 the lower ring 13 of each cutting member 7 is not covered. For this purpose the upper ring 36 shown in FIGS. 2 and 3 is cut off near the paths of travel 29 along two parallel chords 21. The cutters 37 of neighbouring cutting members 7 are relatively off-set through an angle of 90° so that they do not touch one another, although the cutter paths overlap one another.

Each cutting member 7' of the mowing device 1' shown in FIGS. 4 and 5 also has an upper ring 36' and a lower ring 13' partly covered by the former. The cutting member 7' comprises furthermore three cutters 37' distributed along the circumference and being off-set relatively to the cutters 37' of neighbouring cutting members 7'. The cutters 37' are fastened in the same manner as shown in FIG. 3. The upper ring 36' has a diameter b, which is appreciably smaller than the diameter a of the lower ring 13'. The upper ring 36' has at the area of the cutters 37'' radial extensions each holding a bolt 14''. Owing to this shape of the upper ring 36 the lower ring 13' remains uncovered at the area of a path of travel 29' of a neighbouring cutting member 7'. FIGS. 4 and 5 show the lower ring 13' fastened solely via the bolts 14' to the upper ring 36'.

FIG. 5 illustrates to what extent the cutter 37' firmly clamped by means of a bolt 14' may be deformed into the state indicated by broken lines due to an impact on a stone 25. This damaged cutter 37'' is not capable of touching a neighbouring cutting member 7' and will, therefore, not bring about serious damage to the mowing devive 1'. The repairs are thus confined to replacement of said cutter 37' by a new one 37.

In all embodiments shown the mowing device 1 has a low structure and the shape of the cutting members 7 is such that the mowing device 1 can readily slide along beneath the cut crop. The circumferential speed of the cutters 37 is very high, for example, about 80 ms/sec with a circumference diameter e of 45 to 50 cms.

During the mowing operation the mowing device is held in a slightly forwardly inclined position so that the cutting members 7 are at an angle *f* to the ground surface 66.

What is claim is:

1. A mowing device comprising a housing extending transversely of the direction of movement of said device, a plurality of shafts rotatably journalled in said housing and driving gear means arranged in said housing for driving the shafts each shaft projecting upwardly from said housing to present an exposed upper end, and a cutter member fixed to the upper end of each shaft, each cutting member comprising at least one lower ring of substantially circular, uninterrupted circumference, skimming the top side of the housing, an upper ring covering the lower ring, means securing said upper and lower rings together as a unit and including at least one pin, and at least one cutter fastened at the circumference of the cutting member between the upper and lower rings by said pin and projecting radially beyond said lower ring, the cutters of neighbouring cutting members being relatively off-set in the circumferential direction, each upper ring being of irregular shape in plan view to expose at least that portion of the lower ring of each cutting member which is overlapped by the path of travel of each cutter of a neighbouring cutting member.

2. A mowing device as claimed in claim 1 wherein each said upper ring is of generally circular configuration provided with a flattened side cut off mainly along a chord.

3. A mowing device as claimed in claim 1 wherein each upper ring is mainly formed by a ring of appreciably smaller diameter than its associated lower ring, each upper ring having at least one radial extension receiving the associated pin.

4. A mowing device comprising, in combination:
   an elongate housing and drive gear means within said housing;
   at least one pair of generally vertical shafts journalled in said housing and connected to said gear means for rotation thereby, each shaft having an exposed upper end; and
   a pair of cutter assemblies respectively fixed to the exposed upper ends of said shafts; each cutter assembly comprising a lower ring presenting a flat annulus whose inner diameter is less than the width of said housing and whose outer diameter is substantially greater than the width of said housing and such annulus being closely spaced with respect to the top of said housing whereby to guard against the entry of foreign objects between the housing and cutting member, each cutting member also including a cover member rigidly secured to and overlying said lower ring, each cover member including an outer marginal edge portion overlying its associated lower ring and closely spaced thereabove, and a cutter secured between said lower ring and said outer marginal edge portion of the cover member and projecting radially beyond said lower ring, said cutter being of a thickness only slightly less than said spacing between the outer marginal edge portion and the lower ring whereby each cutter is maintained in a substantially fixed cutting plane; the lower rings of the two cutter assemblies being disposed substantially in the same plane and being of diameters such that their outer edges are closely spaced whereby the cutter of one assembly sweeps a path which overlaps a portion of the lower ring of the other cutter assembly and vice versa, the cutters of the two assemblies being circumferentially offset with respect to each other to prevent interference therebetween; and each cover member having an irregular shape in plan view to expose that portion of its underlying lower ring which is overlapped by the path swept by the cutter of the adjacent cutter assembly.

5. A mowing device as defined in claim 4 wherein said housing is provided with a pair of upstanding boss portion, each one surrounding the upper end of a respective shaft, each said cover member being dished to clear its associated boss portions and the inner circumference of each lower ring surrounding the lower part of its associated boss portion substantially where the latter joins the top of said housing.

6. A mowing device as defined in claim 5 wherein each cutter assembly also includes a hub secured to the upper end of the associated shaft and having a horizontal flange, each cover member having a central opening defined an inner marginal edge seated on such flange, and means removably fastening such cover member on such flange.

7. A mowing device as defined in claim 6 wherein each cover members includes outer marginal edge portions closely overlying its associated lower ring, said cutter being secured between one such marginal edge portion and the associated lower ring and being of a thickness nearly equal to the spacing between the cover members and lower ring at such marginal edge portion.

8. A mowing device as defined in claim 4 wherein each cover member is centrally dished and includes outer marginal edge portions closely overlying its associated lower ring, fastener means removably securing said outer marginal edge portions to such associated lower ring and including one member mounting said cutter.

9. A mowing device as defined in claim 8 including a spacer surrounding said one member and interposed between said cover memer and lower ring, said cutter being rotatably mounted on said spacer and being of a thickness slightly less than the thickness of said spacer.

* * * * *